United States Patent [19]

Scholten et al.

[11] 4,386,016
[45] May 31, 1983

[54] PREPARATION OF POROUS, PURE SILICA DIOXIDE AND OF CHROMIUM-OXIDE-ON-SILICA DIOXIDE CATALYSTS

[75] Inventors: Joseph J. F. Scholten, Sittard; Lambertus J. M. A. vande Leemput, Echt, both of Netherlands

[73] Assignee: Stamicarbon, B.V., Geleen, Netherlands

[21] Appl. No.: 315,218

[22] Filed: Oct. 26, 1981

[30] Foreign Application Priority Data

Oct. 24, 1980 [NL] Netherlands .................... 8005856

[51] Int. Cl.³ .................. B01J 29/00; C10B 33/12
[52] U.S. Cl. ................... 252/458; 252/451; 423/338
[58] Field of Search ............. 252/458, 451; 423/335, 423/338

[56] References Cited

U.S. PATENT DOCUMENTS

| | | | |
|---|---|---|---|
| 2,475,984 | 3/1944 | Owen | 34/10 |
| 4,037,042 | 7/1977 | Mueller-Tamm et al. | 526/106 |
| 4,206,297 | 6/1980 | Hoff et al. | 423/338 X |
| 4,225,464 | 9/1980 | Scholten et al. | 252/458 |
| 4,228,260 | 10/1980 | Scholten et al. | 423/338 X |

FOREIGN PATENT DOCUMENTS

| | | | |
|---|---|---|---|
| 1242407 | 11/1971 | United Kingdom | 423/338 |
| 2001044 | 1/1979 | United Kingdom . | |

*Primary Examiner*—Carl F. Dees

[57] ABSTRACT

A process is provided for the preparation of an improved porous silicon dioxide catalyst support, wherein a silicon dioxide prepared by flame hydrolysis is converted into an aqueous gel and thereafter admixed with at least 15 vol. % of a $C_1$ to $C_5$ alkanol, followed by spray-drying of the resulting aqueous/alcohol silica gel. The resulting catalyst support is particularly useful with chromium oxide catalysts for polyalkene polymerizations.

10 Claims, No Drawings

PREPARATION OF POROUS, PURE SILICA DIOXIDE AND OF CHROMIUM-OXIDE-ON-SILICA DIOXIDE CATALYSTS

The invention relates to processes for the preparation of porous, pure silica carried out by converting a silica, prepared by flame hydrolysis, into a gel, using at least the same quantity by weight of water, and then spray-drying the gel.

Such a type of process is known from U.S. Pat. Nos. 4,225,464 and 4,228,260 which are incorporated herein by reference. The silicas obtained by that process are very suitable as carriers for chromium oxide catalysts for the polymerization of olefins, in particular of ethylene. Chromium oxide catalysts on such silica have a good activity. They are suitable especially for the polymerization of ethylene by a solution process, for when polymerization is effected by a suspension process, in which temperatures below 105° C. are used, polymers having very high molecular weights are formed. It is true that such catalysts are sensitive to hydrogen, and thus the molecular weight can be reduced by adding hydrogen, but the presence of hydrogen also results in decreased activity of the catalyst. For sufficient reduction of the very high molecular weights, large amounts of hydrogen need to be mixed with the ethylene, which then results in significant decreases in catalyst activity. Such a decrease in activity is undesirable. Moreover, the recirculation of hydrogen with unconverted ethylene, solvent vapor and possibly comonomers and the separation thereof into the components becomes more expensive with increasing amounts of hydrogen. In view of these factors, it is desirable when employing suspension polymerization, i.e., when using temperatures below 105° C., that the molecular weights of the ethylene polymers formed are not unduly high, so that conventional types of polyethylene can be produced without hydrogen or with addition of only limited amounts of hydrogen.

It has now been found by applying a new silica for the carrier, that improved catalysts satisfying this requirement can be obtained. Such a silica is prepared according to this invention by converting a silica obtained by flame hydrolysis into a gel, using at least the same quantity by weight of water, and they spray-drying the gel, wherein the gel to be spray-dried is mixed—and this is the characteristic of the invention—with at least 15 vol. % of an alkanol having from 1-5 carbon atoms, the amount thereof being calculated in relation to the volume of the water in the gel. The mixture thus obtained is then spray-dried. By preference, the gel is mixed at least 20 vol. % of alcohol.

In the above-mentioned U.S. patents specifications 4,225,464 and 4,228,260, it is already explained that for catalysts of the chromium-oxide-on-carrier type the silica carrier should have a certain porosity, which porosity should be wholly or largely retained upon heating of the carrier. The silicas described in said application have a large pore volume. It has been found, however, that silica gels prepared from a silica, obtained by flame hydrolysis, having a larger surface area generally do not have a satisfactory pore volume. When preparing catalyst carriers, however, it is desirable to start from silica, obtained by flame hydrolysis, which has a large surface area. It is true that the surface area of a silica gel is generally less than that of the silica from which it has been prepared; but on the other hand, the surface area of the silica gel is nonetheless found to increase with the surface area of the starting material. When the silica gel carrier has a larger surface, the loading thereof with, for instance, a chromium oxide catalyst can be higher than is possible on a carrier having a smaller surface area, and that high catalyst dispersion is retained. This appears to result in a greater activity per gram of catalyst.

Some of the known commercially available silicas prepared by flame hydrolysis have surface areas of 130, 200 and 380 m$^2$/g, though, of course, other types are also available. Especially for those silica gels prepared from silica having a surface area of 380 m$^2$/g, it has been found that a large pore volume is developed, when prepared according to this invention, as against the case when no mixing with alcohol takes place prior to the spray-drying. The pore volume of the silica gels prepared according to the method of the present invention is at least 1.0 cm$^3$/g and is advantageously at least 1.5 cm$^3$/g.

The conversion of a silica prepared by flame hydrolysis into a gel with the aid of water can be effected in various ways. The silica can be ground or stirred with water, both at ambient temperatures and at increased temperatures, up to about 100° C., but also under pressure at higher temperatures, for instance, up to 300° C. This can even be done under supercritical conditions.

By preference, the milled or stirred silica/water mixture is allowed to age by standing for some time, generally for at least some hours. Longer aging times, for some days to some months, may still have a favorable effect on the formation of the gel and especially on the mechanical strength of the final product. By preference, aging of the gel prepared in the present invention takes place at increased temperatures, in which case aging times of less than 24 hours are usually sufficient, though even then longer aging times may in some cases be desirable. Temperatures of up to about 100° C. are very suitably used; but under pressure, again, considerably higher and even supercritical temperatures can be applied.

The amount of water employed to form the gel is at least 50 wt. %, calculated in relation to the total weight of silica plus the water. Silica concentrations of from 10 to 20 wt. %, calculated in relation to the mixture, are very suitable; at such concentrations the amount of water thus used is 4 to 8 times as large as the amount of silica. Of course, larger amounts of water may be used to form a gel, but these larger amounts are non economical in the spray-drying step, the more so as the gel is further mixed with at least 15 vol. % and preferably at least 20 vol. % of C$_1$ to C$_5$ alkanol. Thus, for economic reasons, in practice, the amount of water used for the preparation of the gel will be kept as small as possible, which also reduces the alcohol consumption to a minimum.

To silica gel obtained by mixing silica with water and, optionally, subsequent aging of the mixture, at least 15 vol. % and by preference at least 20 vol. %, calculated in relation to the water in the gel, of C$_1$ to C$_5$ alcohol is added. By preference, methanol or ethanol is used. The alcohol must be well miscible with water, and therefore higher alcohols, the miscibility with water of which decreases rapidly with increased numbers of carbon atoms, are not very, or not at all, suitable.

Intimate mixing of the gel with the alcohol is required until a homogeneous mass is obtained. Mixing can be effected in a vessel with a high rpm stirrer, or with a homogenizer, for instance, of the Ultra-turrax type, or by any other suitable method for mixing high-viscosity with low-viscosity materials. When the water content of the gel is not very high, the gel is generally a viscous, jelly-like mass with a viscosity generally exceeding 1000 cP, whereas the viscosity of alcohols at room temperature is on the order of 1 cP. In view of this, careful mixing is a requirement.

In this manner, an alcohol-containing gel is obtained, which is subsequently spray-dried. The amount of alcohol, calculated in relation to the amount of water in the gel, should be at least 15 vol. % and preferably at least 20 vol. %.

Gels containing smaller amounts of alcohol can, of course, also be spray-dried with good results, spray-drying of a gel without alcohol also being known; but with amounts of alcohol less than 15 vol. % the abovementioned ultimate effect (that is, in suspension polymerizations of ethylene with chromium-oxide-on-carrier catalysts on such silicas a polyethylene is produced with a reasonable molecular weight range and distribution, and, in addition, which reacts satisfactorily to the addition of hydrogen), is found to occur to a markedly lesser extent. Moreover, the pore volume, especially with silicas having a large surface area, then also becomes much smaller.

It is not quite clear what causes these effects. It is assumed, though this cannot be regarded as a statement binding the applicant, that the surface tension of the water-alcohol mixture plays a part in that it influences the structure, the surface and the pore volume of the silica gel obtained. At 15 vol. %, and in particular at 20 vol. % or more, of alcohol the resulting surface tension already is substantially less than that of water. Ethanol decreases the surface tension to a greater degree than does methanol, and for that reason ethanol is particularly preferred. As higher alcohol contents are used, the surface tension does decrease even further, but the improvement in the properties of the resulting silica gel are further improved to only a relatively smaller degree.

There are, however, no objections to using larger amounts of alcohol, up to 100 vol. %. The water in the silica gel may even be replaced largely or wholly by the alcohol. In such cases, the subject process can still be employed and the said advantages are still obtained, but the overall economy of the process decreases. For these reasons, the larger amounts of alcohol used will generally be chosen so as not to be excessive, and certainly not considerably larger than is necessary. Partly also for the fire hazard safety reasons, which increases with the amount of alcohol, by preference not more than 100 vol. %, and more particularly not more than 50 vol. % of alcohol will be added. The amounts of alcohol are always calculated in relation to the water volume in the gel.

It has further been found that the acidity of the silica gel may also influence the gel properties, its processability and the final properties of the spray-dried silica gel, in particular its strength.

It is true that a silica gel can be prepared from a silica, obtained by flame hydrolysis, and water at varying acidities, both in an acid environment, i.e., at a pH of 5 or less, and in an alkaline environment, i.e., at a pH of 7 or more, but the best results are observed by preparing the silica gel in a weak acid environment at a pH of about 4 or less, advantageously at a pH of 1.5-3, and in particular at a pH of about 2.5-3, and thereafter mixing the gel with the alcohol, and subsequently spray-drying the product.

After aging of the gel, usually a fairly solid gel is formed. Mixing of this gel with alcohol is found to become even more difficult, as the pH increases to about 4 or higher. In particular, at a pH of approximately 5, even longer and even more careful mixing are necessitated. The gel can then be given better processing properties by adding more water, but this is again undesirable from an economic point of view, for it implies that larger amounts of alcohol are to be used. For the properties of the final product, especially the strength of the gel particles, high pH values are also somewhat less favorable, though they can well be used. On the other hand, the strength of the spray-dried silica gel particles is also found to decrease somewhat when the pH is less than about 2.5, although silica particles can be prepared at pH of less than 2.5 and used and for the preparation of catalysts of the chromium-oxide-on-carrier type.

The desired pH may be adjusted by adding small amounts of mineral acids, e.g., hydrochloric acid or nitric acid, or common bases, e.g., ammonia or alkali metal hydroxides. By preference, the desired pH is established either before or during the mixing thereof with alcohol.

The subject silicas herein described are in particular for use as carriers for catalysts of the chromium-oxide-on-carrier type. It will, however, be apparent that their application is not limited thereto. The subject silicas are also very suitable as carriers for other catalyst materials, or for any other purposes for which the use of a high-porosity silicon dioxide is desired.

Carrier-supported catalysts mostly need to have a certain minimum particle size, in particular when they are to catalyze a reaction conducted in a fluidized bed. The so-called activation of chromium-oxide-on-carrier catalysts, i.e., by heating in a non-reducing or oxidizing atmosphere, is often carried out in a fluidized bed. In polymerization reactions, the particle size of the catalyst has an influence on the particle size of the polymer. When transported, handled and processed, a polymer product of too fine a particle size presents dusting problems, which become all the more serious as the polymer becomes finer. For this reason, and for the other reasons mentioned earlier, the carrier should have an average particle size of at least 0.01 mm and by preference of at least about 0.04 mm, and more particularly of at least about 0.08 mm. Of course, too coarse particles are not very desirable, either. Therefore, the average particle size for the produced silica gel is preferably at most about 0.25 mm, and more particularly at most about 0.20 mm.

In connection with the powder properties of the polymer, it is generally desirable for the polymer to have a narrow particle size distribution, which means that the uniformity factor n (according to Rosin-Rammler) should be at least 2. To obtain such polymer powders, the uniformity factor of the carrier should also be at least 2. These average particle sizes and particle size distributions are determined by screen analysis in a way known per se. The results of the screen analysis can be expressed graphically in a Rosin-Rammler net. The point of this line that corresponds to a screen residue of 36.8% gives the average particle size. The slope of the line is a measure of the width of the particle size distribution. The uniformity factor n increases and the particle size distribution narrows with increasing slopes. The uniformity factor n is, by preference, at least about 2 and more in particular at least about 3.

Spray-drying techniques for diverse materials are generally well-known, and various types of spray-drying installations have been developed. A survey of these is given by K. Kroll in "Trocknungstechnik", part 2: "Trockner and Trocknungsverfahren", Springer Verlag 1959, pages 303–32, the disclosure of which is incorporated herein by reference. The average diameter of the droplets atomized in a spray-drying installation is a function of the surface tension, the density, the viscosity, and of the outflow velocity and angle of outflow from the atomizer. By trial and error adjustments of the particular apparatus employed with a given material, a spray-dried product having a certain particle size can be obtained. In the art of spray-drying, it is also known how to choose the conditions required for the preparation of particles with a narrow particle size distribution. Thus, these are preferably chosen so that a silica gel with a uniformity factor of at least 2, and preferably at least 3 is obtained.

Spray-drying of the gel can be effected using apparatus already known and generally used for such purpose, in which the gel is atomized by a conventional spray nozzle. Spray-drying installations always use heated air. In the present process, the temperatures of the air blown in generally should not exceed about 400° C. Higher temperatures are possible, but for economic and practical reasons they are seldom employed. By preference, the temperature of the air blown in is at most about 250° C. As a matter of course, spray-drying may also be effected in other atmospheres, but the economic disadvantages of the use of large amounts of, for instance, nitrogen, carbon dioxide, carbon monoxide, oxygen, etc., render this inattractive.

It is generally not necessary to spray-dry in an inert atmosphere. At a temperature of the air, as blown in, of at most 250° C. the amount of spray-drying air is so large in relation to the evaporating amounts of water and alcohol that the amount of alcohol vapor formed remains well below the lower explosion limit, even when the alcohol content of the silica gel, calculated in relation to the amount of water, exceeds 20 vol. % and is, for instance, 100 vol. %.

Agglomeration aids such as ammonia, sodium hydroxide or other bases may also be added to the gel. The amounts of sodium hydroxide used are chosen so that the sodium content of the carrier increases by less than 100 ppm of sodium. Upon heating, the silica gels are more sensitive to added sodium than to sodium that is already present. In view of this, ammonia is preferably used as agglomeration aid.

The mechanical strength of the silica gel particles obtained by spray-drying is of importance in the preparation of catalysts of the chromium oxide type. As already stated, the silica carrier, after having been impregnated with a chromium compound, is heated at temperatures of 400°–1000° C. in a non-reducing atmosphere. The most practical embodiment is heating in a fluidized bed. If the mechanical strength of the silica gel particles is insufficient, however, a high degree of abrasion and pulverization occurs. The fine particles are blown out of the fluidized bed and large amounts of catalyst-on-carrier are lost. By adding the agglomeration aid when preparing the gel and by choosing a suitable pH for the gel, mechanically stronger granules are obtained which, under otherwise unchanged spray-drying conditions, are coarser and exhibit none, or hardly any abrasive pulverization upon heating in a fluidized bed.

The silica gels according to this invention can be impregnated with a chromium compound by adding a solution of the chromium compound to the silica gel and removing the solvent by filtration and/or evaporation. Solutions of a chromium compound in water are often used, but when the nature of the chromium compound permits, it is advantageous to use such solutions in organic solvents. The materials can also be mixed properly when in solid condition. The impregnation can introduce chromium oxide in amounts from about 0.01% up to 10% (measured as chromium metal) by weight of the silica carrier.

The silica gel after impregnation with a chromium compound is subsequently heated in a way already known per se at temperatures of 400°–1,000° C. in a non-reducing atmosphere, preferably in an oxygen-containing atmosphere, in order to activate the catalyst-on-carrier. For this type of catalyst, many embodiments are generally known. The activation temperature is often approximately 900° C., and therefore a suitable carrier should be capable of withstanding such temperatures without damage being done, in particular without the pore volume being reduced, or being reduced to any appreciable extent, upon heating at 900° C. The carrier materials prepared by this invention meet this requirement. The application of the chromium compound, if so desired together with other compounds, is already sufficiently well known in the art, and will not be explained further here.

The present process for the preparation of carriers suitable for such catalysts is very economic. By using the subject silica gels for the preparation of catalysts of the chromium-oxide-on-carrier type, catalysts can be prepared which can be particularly well used for the preparation of polyolefins, particularly polyethylene with varying melt indices, by a suspension polymerization process.

The invention will now be further elucidated by means of the following examples of preferred embodiments, without, however, being restricted thereto.

EXAMPLE 1

An amount of 500 g of Aerosil 380 was slowly added to 2830 ml of distilled water, the pH of which had been set at a value of 2 by addition of hydrochloric acid. While the Aerosil was slowly dispersed in the water, the pH was kept at 2, for which purpose some drops of hydrochloric acid are added from time to time. After all the Aerosil had been added to the water, intensive homogenization is then effected for 10 minutes. A rather thin gel was formed, which was allowed to age at 90° C. for 20 hours. Upon cooling to room temperature, a stiff xerogel was formed. An amount of 1200 ml ethanol (96 vol. % concentration) was now added, whereupon the mixture was homogenized. A rather thin, thixotropic gel containing 28.6 vol. % of alcohol calculated on the liquid phase was formed, which was spray-dried in an IWK-spray-drying installation, through which 200 m$^3$ of air was passed through per hour, the inlet temperature of the air being 180° C., with an outlet temperature of 90° C.

The spray-dried silica obtained had a pore volume, measured by the mercury penetration method, of 1.80 cm$^3$/g. After heating at 900° C., the pore volume was 1.74 cm$^3$/g. The specific surface area (BET surface)

was 290 m²/g, the average particle size 0.065 mm, and the uniformity factor n was 2.3.

Aerosil 380 is a silicon dioxide marketed by Degussa that is prepared by flame hydrolysis. Aerosil 380 has a specific surface of 380 m²/g. The average primary particle size is 8 nm.

COMPARATIVE EXAMPLE A

Example 1 was repeated, but now 500 g of Aerosil 380 was dispersed in 4,000 ml water (pH=2), and spray-drying was effected in the same way after 20 hours aging at 90° C.

In this case, the pore volume was instead only 1.40 cm³/g and did not change on heating at 900° C. The surface area was 280 m²/g. The average particle size was 0.075 mm.

EXAMPLE 2

In the same manner as described in Example 1, 500 g of Aerosil 200 V (specific surface 200 m²/g, average primary particle size 16 nm) was processed into an alcohol-containing gel and subsequently spray-dried, as described in Example 1. The pore volume of the spray-dried product was 1.90 cm²/g, and the surface 190 m²/g. The average particle size obtained was 0.075 mm and the uniformity coefficient n 2.85.

COMPARATIVE EXAMPLE B

In the same way as described in Comparative Example A, 500 g of Aerosil 200 V was gelled in 4000 ml water and spray-dried. The pore volume of the spray-dried product was now only 1.6 cm³/g, and the specific surface was only 180 m²/g. The average particle size was 0.070 mm.

EXAMPLE 3

An amount of 45 g of chromium (III) acetylacetonate was dispersed in 120 ml dry heptane, with stirring, and then 98 ml pure triisobutylaluminum (TIBA) was added and the mixture was allowed to boil, reflux cooling being applied, until a dark solution formed. An amount of 70 g of the silica obtained as described in Example 2 was first heated for 4 hours at a temperature of 180° C. in a nitrogen atmosphere, and after cooling in the nitrogen atmosphere, it was dispersed in 500 ml dry heptane. While the mixture was being stirred, 13.7 ml of the solution of the reaction product of chromium (III) acetylacetonate and triisobutylaluminum was added. The heptane was removed by evaporation and the silica, on which the complex chromium compound had precipitated, was then heated for eight hours at 900° C. in a flow of dry air, whereupon it was allowed to cool to room temperature.

The resulting silica support contained 0.52 wt. % of chromium.

Isobutane and triethyl borium (1 mg of borium per kg of isobutane) were introduced into a 5 liter autoclave in amounts of 1.2 kg and 10.7 mg respectively and subsequently heated at 103° C. Ethylene and hydrogen were introduced under pressure in the autoclave until the ethylene pressure was 1,000 kPa and the hydrogen pressure in the gas phase was 800 kPa, and via a catalyst-metering system approximately 400 mg of catalyst was added. The temperature was kept at 103° C., and the ethylene pressure was kept constant by introducing more ethylene under pressure. After 90 minutes, the polymerization was terminated. The yield was 900 g of polyethylene. The polyethylene was analyzed for the presence of silicon and was found to contain 400 mg of silica ($SiO_2$) per kg of polymer (0.04 wt. %). The productivity therefore is 2,500 g of polyethylene per gram of catalyst (or per 0.0052 g. Cr). The melt index of the polyethylene, determined as per ASTM D-1238, is 3.2.

COMPARATIVE EXAMPLE C

The polymerization as described in Example 3 was now effected with catalyst prepared in the same way, but using the silica of Comparative Example B as the carrier.

The polyethylene product then contained 455 mg of silica, which corresponds to a productivity of 2,200 g of polyethylene per gram of catalyst (a 12% reduction in yield as compared to Example 3). The melt index of this polyethylene was now only 1.2.

Thus, the process of the present invention provides superior silica gel catalyst support material having the desirable combination of high surface area and high pore volume which permits the preparation of improved supported catalyst systems which provide superior production of, e.g., ethylene (or alkene-1) polymers. Those skilled in the art will further understand that while $C_1$-$C_5$ alkanols are preferred for the process described, alcohols of comparable vapor pressures such as methoxy or ethoxy methanols or ethanols may be employed as well and fall within that classification of materials to be used.

What is claimed is:

1. A process for the preparation of porous silicon dioxide having the combination of high surface area and high pore volume consisting essentially in the combination of steps of converting a silicon dioxide prepared by flame hydrolysis into an aqueous gel, using at least the same quantity by weight of water, mixing therewith at least 15 vol. % of a $C_1$ to $C_5$ alkanol, calculated in relation to the volume of the water in the gel, aging said gel for at least a period of hours, and thereafter spray-drying the resulting aqueous/alcohol silica gel.

2. Process according to claim 1, wherein at least 20 vol. % of alkanol is mixed with said aqueous gel.

3. Process according to either one of claims 1 or 2, wherein up to about 100 vol. % of alkanol is mixed with the silica gel.

4. Process according to either one of claims 1 or 2, wherein at most 50 vol. % of alkanol is mixed with the silica gel.

5. Process according to either one of claims 1 or 2, wherein said alkanol is methanol or ethanol.

6. Process according to either one of claims 1 or 2, wherein said alkanol is ethanol.

7. Process according to either one of claims 1 or 2, wherein the pH of said aqueous gel is adjusted to be at most about 4.

8. Process according to either one of claims 1 or 2, wherein the pH of said aqueous gel is adjusted to be from 1.5 to 3.

9. Process according to either one of claims 1 or 2, wherein the pH of said aqueous gel is adjusted to be from 2.5 to 3.

10. A process for the preparation of a chromium oxide catalyst impregnated on a silicon dioxide carrier wherein said silicon dioxide carrier has been prepared according to either one of claims 1 or 2.

* * * * *